United States Patent [19]

Bright et al.

[11] Patent Number: 4,666,520

[45] Date of Patent: May 19, 1987

[54] CEMENTITIOUS COMPOSITE MATERIAL WITH SILICON CARBIDE AGGREGATE

[75] Inventors: Randall P. Bright, Bowie; David D. Double, Annapolis; Sean Wise, Millersville, all of Md.

[73] Assignee: F. P. C. Research, Inc., Clinton, Md.

[21] Appl. No.: 777,324

[22] Filed: Sep. 18, 1985

[51] Int. Cl.$^4$ .............................. C04B 7/02
[52] U.S. Cl. ........................ 106/97; 106/98
[58] Field of Search ...................... 106/97, 98

[56] References Cited

U.S. PATENT DOCUMENTS

| | | | |
|---|---|---|---|
| 3,790,394 | 2/1974 | Magnan | 106/97 |
| 4,111,711 | 9/1978 | Kiehl et al. | 106/97 |
| 4,398,960 | 8/1983 | Murray | 106/97 |
| 4,472,201 | 9/1984 | Ochi et al. | 106/98 |
| 4,482,385 | 11/1984 | Satkowski | 106/97 |

*Primary Examiner*—William R. Dixon, Jr.
*Assistant Examiner*—Steven Capella
*Attorney, Agent, or Firm*—Lawrence I. Field

[57] ABSTRACT

An improvement over the cementitious composite material described in U.S. Pat. No. 4,482,385 consists in replacing the stainless steel particles with graded silicon carbide particles. The resulting material has a lower coefficient of thermal expansion, a greater thermal conductivity and an increased surface abrasion resistance as compared to the material described in the patent and is a lighter weight material. These properties enhance its applicability to certain uses.

6 Claims, No Drawings

CEMENTITIOUS COMPOSITE MATERIAL WITH SILICON CARBIDE AGGREGATE

This invention is directed to a cementitious composite material which is an improvement over the material described in U.S. Pat. No. 4,482,385 issued Nov. 13, 1984. The material described in that patent is a composite cementitious material with unusually high strength, vacuum integrity and other desirable properties and comprises Portland cement and irregularly shaped stainless steel particles as the principal filler.

While the patented material is satisfactory for its intended purpose, for certain end uses it would be desirable to have a material with a smaller coefficient of thermal expansion, a greater thermal conductivity, an increased surface abrasion resistance and a lower density material.

Thus for an autoclave tool such as that described in the patent it is desirable that the thermal expansion of tool closely match that of the material being fabricated. Since the coefficient of thermal expansion for carbon and Kevlar ® composites is in the range of up to $3 \times 10^{-6}/°C$. such materials are not compatible with the patented material which has a coefficient of thermal expansion of between 11 and $14 \times 10^{-6}/°C$.

Furthermore the thermal conductivity of the patented material (1.9–2.7 W/mK) is undesirably low and a material with a higher thermal conductivity when fashioned into a tool would exhibit a more rapid temperature cycling capability and a more uniform temperature throughout the tool.

The need for improved surface abrasion resistance is apparent in tooling applications where severe attritional conditions are likely to be encountered, e.g., in injection molding.

To achieve the desired improvements in the patented material, the stainless steel particles which serve as the principal aggregate have been replaced with silicon carbide particles, and some adjustment has been made in the composition proportions.

Accordingly, the present invention is a composite material which is produced from a mixture including the following:

(a) Portland Cement (Preferably API Class H)
(b) Pozzolanic Silica (Preferably tiny spherical particles of amorphous silica known as condensed silica fume)
(c) Finely Divided Silica
(d) A Type F Superplasticizer (Preferably Sodium Salt of Formaldehyde Condensate of Naphthalene Beta Sulfonic Acid)
(e) An Antifoam Agent
(f) Graded Silicon Carbide
(g) Water Because of the better packing efficiency of the SiC particles as compared with the stainless steel filler of the patent, more silicon carbide (about 40% by volume) may be used as compared with about 25% by volume of the stainless steel.

Each of the individual ingredients will now be described in detail.

(a) The Portland Cement

While it appears that any of the various grades of Portland Cement which are commercially available are suitable for the production of the material of this invention, Type III Portland Cement is preferred and the Portland Cement known as API Class H is particularly preferred. Class H is the coarsest grind of Portland Cements. The Portland Cement component comprises between 22 and 30% by weight of the mixture, about 27.06% being particularly preferred.

(b) The Pozzolanic Silica

The chemically active silica used in the mixture which produces the cementitious composite material of this invention is preferably an amorphous, non-crystalline, pozzolanic silicon dioxide and is preferably condensed silica fume.

This condensed silica fume is produced as a by-product in the electric arc furnace production of silicon or silicon alloys such as ferrosilicon. The gases which are evolved during the manufacture of ferrosilicon from quartz, coke and iron ore when they are heated to up to about 2000° C. contain silicon and silicon monoxide vapors which form silicon dioxide when they react with air as they emerge from the furnace. These vapors condense and the very tiny spherical particles which result from condensation of the vapors are almost entirely amorphous silica with 20–25 m²/g surface area. Typically, the particles analyze 85–92% $SiO_2$, up to 3% $Fe_2O_3$, 1–3% alkali metal oxides, 1–2%C, and the remainder being small amounts of alumina, lime and magnesia. The particles range from 0.01 to 0.3 micron with about 70% being smaller than 0.1 micron. This material is also described in U.S. Pat. No. 4,321,243 issued Mar. 23, 1982.

The condensed silica fume is believed to have pozzolanic properties in the present composition. Although in itself it possesses little or no cementitious value, it will, at ordinary temperatures, in the presence of moisture, chemically react with calcium compounds to form compounds possessing cementitious properties. The amount of condensed silica fume in the mixture should be between 3 and 4% by weight and about 3.6% is a preferred amount.

(c) Fine Aggregate

The mixture also includes a fine aggregate, preferably crystalline or fused silica. Min-U-Sil ® is a crystalline silica—and consists of finely divided—generally finer than 5 micron size particles of quartz or silica. Useful fused silica particles are of similar dimensions and consist of silica, principally in a glassy form. Amounts between 5 and 20% by weight have been used with excellent results at 13.17% which is a preferred amount. The Min-U-Sil ® or fused silica particles increase the packing density of the mixture which is advantageous in terms of reducing the permeability of the hardened product and of increasing its strength; additionally, they may be chemically reactive in the mixture.

Two possible reactions involving the finely divided silica fume and possibly the finely divided silica and leading to the production of tobermorite might be the following which occur at slightly elevated temperatures (e.g., 150°–200° C.):

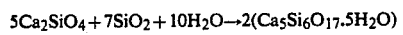

Furthermore, the use of silica fume in the mixture confers additional benefits. Because it is so finely divided, it helps to fill any interstital voids in the mixture and because it is chemically reactive, it reacts with any $Ca(OH)_2$ which may be present, or which forms from the hydrolysis of calcium silicates in the Portland Cement, and therefore counteracts the known deleterious effects which are produced when free $Ca(OH)_2$ or free CaO are present in cements.

The amount of fine aggregates in the mixture should be between 5 and 20 by weight and about 10 to 15% is a preferred amount. In the mixture, the total amount of added $SiO_2$ should bring the ratio of $CaO:SiO_2$ to about 5:6.

(d) Superplasticizer

To make the final mixture more fluid and to permit better wetting and mixing, a plasticizer is included in the composition, the preferred plasticizer being sold as Mighty 100 or Mighty 150, the active ingredient of which is the sodium salt of formaldehyde condensate of naphthalene beta-sulfonic acid. Mighty 150 is available as a liquid. While it is not intended to be bound by any theoretical explanation, it is believed that the superplasticizer affects the zeta potential of the mixture and prevents flocculation. It also appears to increase the strength of the product by permitting the use of smaller amounts of water. Other known plasticizers may be used in place of Mighty 100 or Mighty 150 to disperse the silica fume in the mixture. Amounts between 1% and 2% by weight have proven beneficial and a particularly preferred amount is about 1.4% by weight of the mixture, corresponding to about 0.58% by weight of dry plasticizer, by weight of the mixture.

(e) Antifoaming Agent (optional)

The composite produced from the above admixture is improved by the incorporation of an antifoaming agent, Tri-n-butyl phosphate being the preferred additive, the purpose of which is to reduce the amount and size of air pockets created or trapped in the final cementitious composite material which would decrease the physical properties. The amount of antifoam agent in the mixture should be between 0.01 and 0.5% by weight and 0.03% by weight is a preferred amount. When the mixture is vacuum mixed the antifoam agent may not be necessary.

(f) Principal Filler

Instead of the stainless steel particles used as the principal filler in the compositions of U.S. Pat. No. 4,482,385, particles of silicon carbide are used as the principal filler in the compositions of this invention. By making this change, a composition is produced with a diminished coefficient of thermal expansion, an increased thermal conductivity, an increased surface abrasion resistance and a lower weight.

The silicon carbide particles should preferably be between 8 and 100 mesh (U.S. Standard Sieve Size) and mixtures with 8/100 and 20/100 U.S. Standard Sieve Size materials have been used successfully. The amount of SiC in the mixture is preferably at least about 30% by volume and may be up to 50%, corresponding to weight percents of about 37.5% and more, up to 60% by weight.

(g) Water

Water, preferably distilled water, is the final constituent of the mixture required to produce the high strength composite of this invention. In order to obtain a product with the desired properties between 5 and 10% of water is added, the preferred amount being about 6.5%.

Table I gives a range of preferred proportions of the several ingredients in the mixture from which the composite is produced.

In the tables which follow exemplary compositions of this invention are set forth in Table II together with an example of the composition of U.S. Pat. No. 4,482,385, and their properties are given in Table III.

TABLE I

| | In % By Weight | |
|---|---|---|
| | Range | Preferred |
| Portland Cement | 22 to 30 | 25 to 27 |
| Pozzolanic Condensed Silica Fume | 3 to 4 | 3.5 |
| Finely Divided Silica | 5 to 20 | 10 to 15 |
| Superplasticizer (liquid) | 1 to 2 | 1.4 |
| Antifoam Agent* | 0.00 to 0.5 | .03 |
| Silicon Carbide (8 to 100 mesh) | 35 to 60 | 48+ |
| Water | 5 to 10 | 6.5 |

*optional

TABLE II

| | Illustrative Composition of Mixes | | | | | | | | | |
|---|---|---|---|---|---|---|---|---|---|---|
| | Mix of U.S. Pat. No. 4,482,385 | | Silicon Carbide Mixes | | | | | | | |
| | | | 052-120 | | 052-121 | | 052-172 | | 052-173 | |
| Composition | W % | V % | W % | V % | W % | V % | W % | V % | W % | V % |
| Stainless Steel 10/25 | 34.8 | 16.1 | | | | | | | | |
| Stainless Steel 80/100 | 18.7 | 8.6 | | | | | | | | |
| Silicon Carbide 8/100 | | | 51.9 | 43.1 | 51.9 | 42.1 | | | | |
| Silicon Carbide 20/100 | | | | | | | 48.2 | 39.6 | 49.2 | 39.6 |
| Portland Cement (Class H) | 24.3 | 28.4 | 25.0 | 21.1 | 25.0 | 20.6 | 27.1 | 22.6 | 27.6 | 22.6 |
| Min-U-Sil | 11.8 | 16.2 | 12.2 | 12.4 | | | 13.2 | 13.2 | | |
| Fused Silica (321) | | | | | 12.2 | 14.4 | | | 11.3 | 13.2 |
| Silica Fume | 3.3 | 5.5 | 3.4 | 4.1 | 3.4 | 4.0 | 3.7 | 4.4 | 3.7 | 4.4 |
| Water | 6.2 | 22.4 | 6.4 | 16.9 | 6.4 | 16.5 | 6.5 | 17.2 | 6.7 | 17.2 |
| MT 150 | 0.9 | 2.8 | 1.1 | 2.3 | 1.1 | 2.3 | 1.4 | 3.0 | 1.4 | 3.1 |
| Tri-n-butylphosphate | 0.02 | 0.09 | 0.03 | 0.07 | 0.03 | 0.07 | Vacuum Mixed | | | |
| W/C ratio | 0.28 | | 0.28 | | 0.28 | | 0.27 | | 0.27 | |
| W/C + S ratio | 0.17 | | 0.17 | | 0.17 | | 0.166 | | 0.176 | |
| Flow Values % | 115 | | 102 | | 125 | | 73 | | 70 | |

TABLE III

| | Properties of illustrative Mixes | | | | |
|---|---|---|---|---|---|
| | Mix of U.S. Pat. No. | Silicon Carbide Mixes | | | |
| Properties | 4,482,385 | 052-119 | 052-120 | 052-172* | 052-173* |
| 7 day strength Compressive | | | | | |

TABLE III-continued

Properties of illustrative Mixes

| Properties | Mix of U.S. Pat. No. 4,482,385 | Silicon Carbide Mixes | | | |
|---|---|---|---|---|---|
| | | 052-119 | 052-120 | 052-172* | 052-173* |
| (psi) | 25,000 | 20,800 | 21,130 | 23,900 | 22,600 |
| (MPa) | 172 | 143 | 146 | 165 | 156 |
| Flexural | | | | | |
| (psi) | 2,500 | 2,420 | 2,580 | 3,680 | 3,250 |
| (MPa) | 17 | 17 | 18 | 25 | 22 |
| Thermal cycled | | | | | |
| Compressive | | | | | |
| (psi) | 50,000 | 33,000 | 29,500 | 40,380 | 33,250 |
| (MPa) | 345 | 228 | 203 | 278 | 229 |
| Flexural | | | | | |
| (psi) | 4,000 | 3,480 | 3,460 | 3,780 | 4,490 |
| (MPa) | 28 | 24 | 24 | 26 | 31 |
| Density (kg/m$^3$) | 3,650 | 2,660 (average) | | | |
| Thermal conductivity W/m · k | 2.7 | 4.8 (estimated) | | | |
| Thermal expansion/ °C. $\times 10^6$ | 11–14 | 4–5 | | | |
| Modulus elasticity | | | | | |
| psi | 7 $\times$ 10$^6$ | 9.6 $\times$ 10$^6$ (estimated) | | | |
| MPa | 49 | 67 | | | |
| Specific heat | | | | | |
| BTU/lb °F. | 0.188 | 0.24 (estimated) | | | |
| J/kg · k | 787 | 1005 | | | |
| Thermal diffusivity m$^2$/S | 9.4 $\times$ 10$^{-7}$ | 18.0 $\times$ 10$^{-7}$ (estimated) | | | |

The mixture is prepared generally in accordance with ASTM procedure C305 for mechanical mixing of hydraulic cements (Part 5) as described in U.S. Pat. No. 4,482,385. The present material is designed to be mixed either in air or under vacuum conditions.

It will be seen that the strengths of the SiC mixes compare quite favorably with those containing stainless steel particles as the principal filler. Compressive strengths of fully cured samples are sigificantly lower (30,000–40,000 psi) but flexural strengths are comparable. The compressive strengths are, however, more than adequate for tooling applications. The retention of a high flexural strength combined with a much lower density are advantageous in the design of thin-shelled tools which are prone to mechanical damage—accidental or otherwise.

A significant reduction has been achieved in the thermal expansion coefficient, as compared with the products of U.S. Pat. No. 4,482,385 and this is retained at elevated temperatures such as 1000° F.

Having now described preferred embodiments of the invention, it is not intended that it be limited except as may be required by the appended claims.

We claim:

1. A high strength cementitious composite material for use as a tool which is the material prepared by setting a mixture comprising the following in percent by weight:

| Portland Cement | 22 to 30 |
|---|---|
| Chemically Active Pozzolanic Condensed Silica Fume | 3 to 4 |
| Less Chemically Active Finely Divided Silica Particles | 5 to 20 |
| Superplasticizer (liquid) | 1 to 2 |
| Graded Silicon Carbide Particles, between 8 and 100 mesh (U.S. Standard Sieve) | 35 to 60 |
| and Water | 5 to 10 | in which the graded silicon carbide particles constitute at least 35% of the composite material, whereby the composite material has a lower coefficient of thermal expansion, a greater thermal conductivity and an increased abrasion resistance as compared to an otherwise similar material in which the principal filler is stainless steel particles.

2. The material of claim 1 in which the mixture was prepared by vacuum mixing the ingredients.

3. The composite material of claim 1 prepared from a mixture comprising the following in percent by weight:

| Portland Cement | 25 to 27 |
|---|---|
| Chemically Active Pozzlanic Condensed Silica Fume | 3.5 |
| Less Chemically Active Finely Divided Silica Particles | 10 to 15 |
| Graded Silicon Carbide Particles Between 8 and 100 mesh (U.S. Sandard Sieve) | 48 to 55 |
| Superplasticizer | 1.4 |
| and Water | 6.5 |

4. The composite material of claim 1 in which the Portland cement is Class H.

5. A mixture from which the composite material of claim 1 may be prepared comprising the following in weight percent:

| Portland Cement | 22 to 30 |
|---|---|
| Chemically Active Pozzolanic Condensed Silica Fume | 3 to 4 |
| Less Chemically Active Finely Divided Silica Particles | 5 to 20 |
| Superplasticizer (liquid) | 1 to 2 |
| Graded Silicon Carbide Particles, Between 8 and 100 Mesh (U.S. Standard Sieve) | 35 to 60 |
| and Water | 5 to 10 |

6. The material of any of claims 1, 3 or 5 wherein the mixture includes in addition between 0.01 and 0.5% by weight of an antifoaming agent.

* * * * *